US006565438B2

(12) United States Patent
Ogino (10) Patent No.: US 6,565,438 B2
(45) Date of Patent: May 20, 2003

(54) VIDEO GAME CONTROL ADAPTER APPARATUS (75) Inventor: Toshikazu Ogino, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/920,358

(22) Filed: Aug. 1, 2001

(65) Prior Publication Data

US 2002/0022519 A1 Feb. 21, 2002

(30) Foreign Application Priority Data

Aug. 15, 2000 (JP) ........................ 2000-246493

(51) Int. Cl.[7] .................. A63F 13/00; A63F 9/24; G06F 17/00; G06F 19/00
(52) U.S. Cl. .................. 463/37; 463/39; 463/47
(58) Field of Search .............. 463/36, 37, 38, 463/39, 46, 47; 341/20

(56) References Cited

U.S. PATENT DOCUMENTS

| 4,540,176 | A | * | 9/1985 | Baer ...................... 273/148 B |
| 4,924,216 | A | * | 5/1990 | Leung ........................ 340/709 |
| 5,766,077 | A | * | 6/1998 | Hongo ........................ 463/30 |
| 6,025,830 | A | * | 2/2000 | Cohen ........................ 345/156 |
| 6,171,190 | B1 | * | 1/2001 | Thanasack et al. ........... 463/51 |
| 6,238,289 | B1 | * | 5/2001 | Sobota et al. ................. 463/39 |
| 6,290,565 | B1 | * | 9/2001 | Galyean, III et al. ......... 446/99 |
| 6,383,079 | B1 | * | 5/2002 | Takeda et al. ................ 463/43 |
| 6,392,613 | B1 | * | 5/2002 | Goto ........................... 345/30 |
| 2002/0006828 | A1 | * | 1/2002 | Gerding ....................... 463/46 |
| 2002/0010021 | A1 | * | 1/2002 | McCauley .................... 463/37 |

FOREIGN PATENT DOCUMENTS

| JP | 02182282 | 7/1990 |
| WO | WO9732641 | 9/1997 |

* cited by examiner

Primary Examiner—Denise L. Esquivel
Assistant Examiner—Marc Norman
(74) Attorney, Agent, or Firm—Ladas & Parry (57) ABSTRACT A video game control adapter includes a reception adapter that attaches to a connector of a video game device that displays a game image on a video display; and a transmission adapter that transmits a control signal toward the reception adapter when a switch built into a toy to which the transmission adapter attaches is switched ON.

8 Claims, 7 Drawing Sheets

VIDEO GAME CONTROL ADAPTER APPARATUS

BACKGROUND OF THE INVENTION

1. Field of the Invention

The present invention relates generally to a video game control adapter apparatus, and more particular, to a video game control adapter apparatus that displays a video game image on an associated video display in response to a control signal transmitted without a cable.

2. Description of the Related Art

The typical home video game device has an output terminal that is connected to a display unit such as a television set and an input terminal that accommodates a cable from a controller. The video game device itself is equipped with both a disk drive unit with a turntable that rotatably drives a disk (such as a CD-ROM) on which is recorded the game software that animates the device as well as a pick-up unit (an optical pick-up unit) that reads the data recorded on the game software disk.

The video game device generates image data from the data read from the device and displays the image on the video display. Additionally, the video game device also generates image data in response to a control signal input thereto in response to the operation of control buttons provided on the controller.

Accordingly, a video game player can participate in the game displayed on the video display by manipulating the buttons on the controller while watching the video display on which the game image data is displayed. Moreover, depending on the type of game activity (fishing and shooting are typical examples), it is possible to purchase special dedicated controllers designed specifically for that game. In such a case, by connecting the special controller cable to the video game device, the game player can get a more realistic feel for the game activity (fishing, shooting, etc) than is possible with the ordinary general-purpose controller.

However, the conventional arrangement described above has a disadvantage in that, although the special controller gives the game player a more realistic feel for the game than is possible with the ordinary controller, the game player must nevertheless purchase the special controller separately, thereby incurring additional costs which are not insubstantial.

Additionally, both the ordinary controller and the special controller require the use of a cable to connect the controller to the input terminal of the video game device. The range of movement of the game player is thus restricted by the length of the cable, which is undesirable. Thus, in a shooting game in which the controller is formed into the shape of a pistol, for example, the game player cannot take the pistol in hand and wield it freely but must instead remain close to the video display or to the video game device, as the case may be.

As a result of such a drawback, the game player cannot fully enjoy the video game because the freedom of movement of the game player is restricted by the control cable connecting the controller and the video game device.

BRIEF SUMMARY OF THE INVENTION

Accordingly, it is a general object of the present invention to provide an improved and useful video game control adapter apparatus in which the drawbacks described above are eliminated.

The above-described object of the present invention is achieved by a video game control adapter apparatus that includes a reception adapter that attaches to a connector of a video game device that displays a game image on a video display as well as a transmission adapter that transmits a control signal toward the reception adapter when a switch built into a toy to which the transmission adapter attaches is switched ON.

According to this aspect of the present invention, any toy with a built-in switch can be used as a controller instead of the ordinary video game controller, which increases the range of choices of controllers as well as the pleasure gained from using a controller adapted to a particular game.

Additionally, according to the above-described aspect of the present invention, control signals can be transmitted to the video game device in response to a manipulation of the toy without a cable by using radio waves, light or sound, so the movements of the game player are not restricted by the cable.

Additionally, the above-described object of the present invention is also achieved by the video game control adapter apparatus as described above, wherein the reception adapter includes a reception sensor that has directivity.

According to this aspect of the present invention, the range within which signals transmitted from the transmission adapter attached to the toy can be restricted to a predetermined range. Thus, signals outside the predetermined range constitute "misses" and signals within the range constitute "hits", thereby enabling the video game to function as a game.

Additionally, the above-described object of the present invention is also achieved by the video game control adapter apparatus as described above, wherein the transmission adapter is substantially card-shaped.

According to this aspect of the present invention, the card-like shape of the transmission adapter enables the transmission adapter to be fitted to a wide variety of toy shapes, such shapes including, but not limited to, toy pistols, toy swords, toy cosmetic compacts, and so forth.

Additionally, the above-described object of the present invention is also achieved by the video game control adapter apparatus as described above, wherein the transmitting part of the transmission adapter that transmits the control signal is provided on a projecting portion that projects from the toy.

According to this aspect of the invention, the placement of the transmitting part of the transmission adapter on a projecting portion that projects from the toy allows the transmission of control signals from the transmission adapter to the reception adapter to proceed without interference from the toy, which may be of irregular shape.

It should be noted that a receiving part of the reception adapter need not necessarily project from the reception connector. Instead, it is sufficient that such receiving part be externally exposed so as to be able to receive transmission of control signals from the transmission adapter.

Additionally, the above-described object of the present invention is also achieved by the video game control adapter apparatus as described above, wherein the control signal is a radio wave, an optical signal, or an audio signal.

According to this aspect of the present invention, the use of a cable to connect the toy with the video game device is no longer required, thereby increasing the freedom of movement of the game player and enhancing the pleasure of the video game activity.

BRIEF DESCRIPTION OF THE DRAWINGS

These and other objects, features, aspects and advantages of the present invention will become better understood and more apparent from the following description, appended claims and accompanying drawings, in which:

DETAILED DESCRIPTION OF THE INVENTION

A description will now be given of a video game control adapter apparatus according to one embodiment of the present invention, with reference to the accompanying drawings. It should be noted that identical or corresponding elements in all drawings are given identical or corresponding reference numbers, with a detailed description thereof given once and thereafter generally omitted for brevity of explanation.

Figure 1:
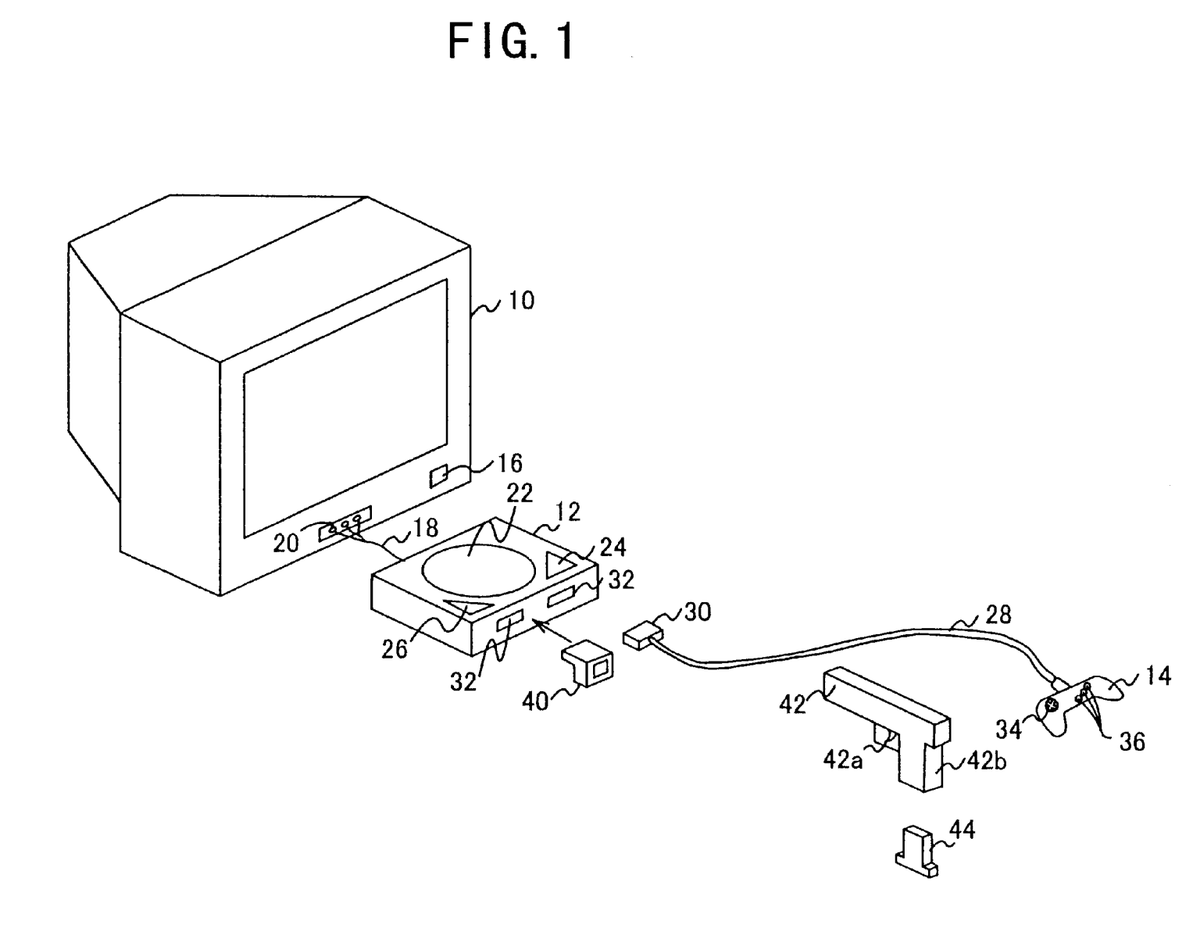
FIG. 1 is a perspective view of a video game system employing a video game control adapter apparatus according to one embodiment of the present invention.

FIG. 1 is a perspective view of a video game system employing a video game control adapter apparatus according to one embodiment of the present invention.

As shown in FIG. 1, the video game system comprises a television set as a video display 10, to which a video game device 12 is attached by a cable 18, and a controller 14. The game player enjoys the game by manipulating the controller 14 in response to the images shown on the video display 10.

A front of the television set that functions as the video display 10 includes a power switch 16 and a jack 20 to which a plug end of the cable 18 from the video game device 12 is fitted. A rear surface of the video game device 12 has an output terminal (not shown in FIG. 1 because not viewable from the angle shown in FIG. 1) to which the other end of the cable 18 is fitted, thus connecting the video game device 12 to the television set that functions as the video display 10.

Additionally, an upper surface of the video game device 12 has a disk holder portion 22 that accommodates a CD-ROM (not shown in FIG. 1) on which the game software is recorded, a power switch 24, and an eject switch 26. A front surface of the video game device 12 is provided with a connector 32 to which a terminal 30 of the cable 28 of the controller 14 is connected.

Ordinarily, the game player can cause a character displayed on the screen of the video display 10 to move, for example, or can attack an enemy character so displayed by manipulating switches 34, 36 on the controller 14 connected to the connector 32 of the video game device 12 via the cable 28.

However, when using the controller 14, the length of the cable 28 limits the positioning of the game player so that the game player cannot move freely. In the case of a shooting game, for example, the game player cannot take cover and shoot at the opposing character from behind such cover, which takes some of the fun out of the game.

In contrast to such types of cable-type controllers 14, there are radio-type controllers that are sold separately. However, such radio-operated controllers represent an additional cost to the consumer as compared to the ordinary cable-type controller 14.

In the present embodiment, a reception adapter 40 that is designed to be attached to the connector 32 of the video game device 12 is attached to the connector 32, and a transmission adapter 44 that is designed to be attached to a control unit 42 is attached to a control unit 42 which, in this case and for illustrative purposes only, happens to be a toy pistol. The toy pistol 42 is configured so that whenever the game player pulls the trigger 42a a switch signal or volume signal is output, with the transmission adapter 44 being attached to a grip portion 42b of the toy pistol 42.

Figure 2:
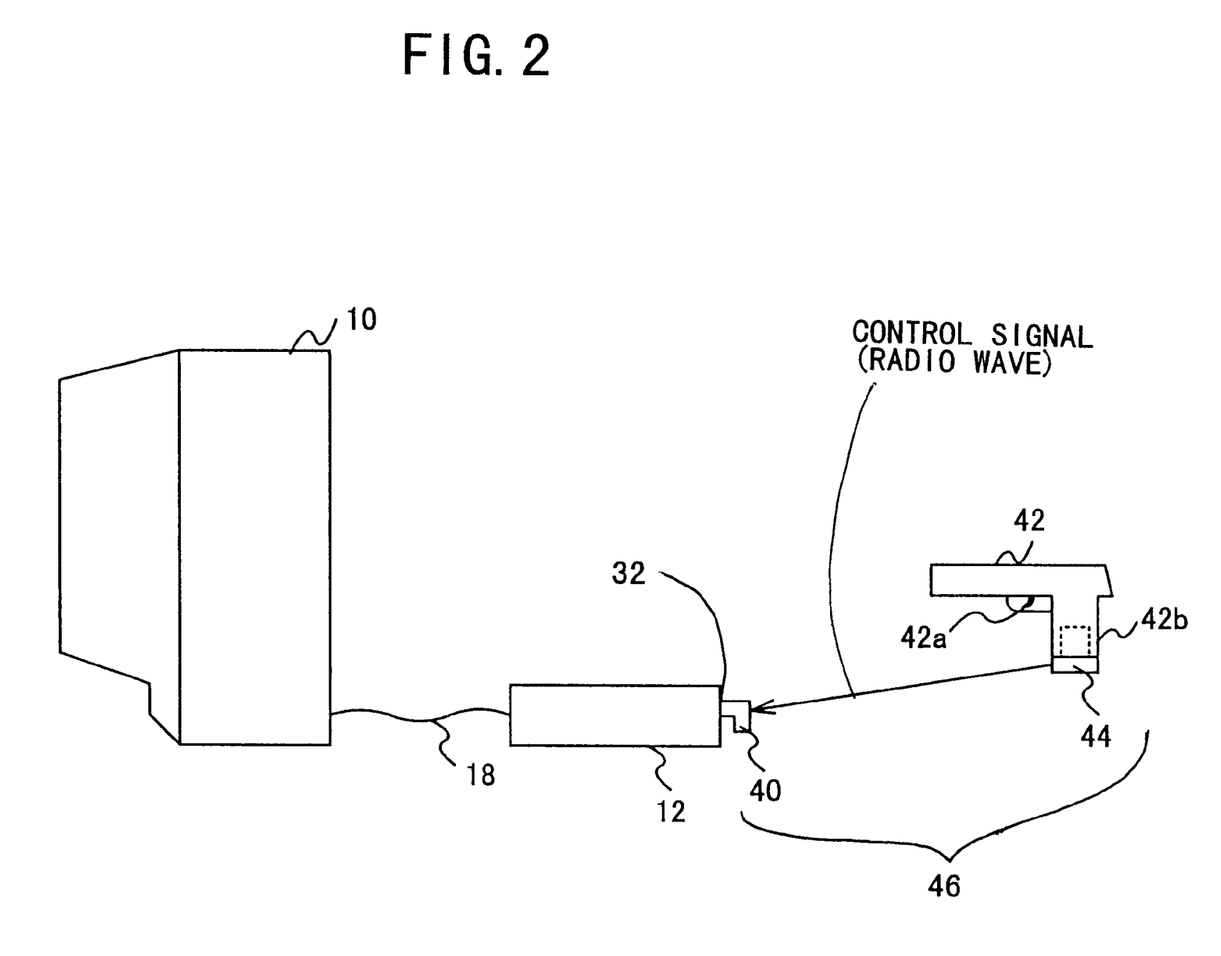
FIG. 2 is a lateral view of the video game control adapter apparatus in use.

FIG. 2 is a lateral view of the control adapter in use.

As shown in FIG. 2, a control adapter apparatus 46 comprises the above-described reception adapter 40 and the transmission adapter 44, the latter formed into substantially the shape of a card. As noted above, the reception adapter 40 is designed to be inserted into the connector 32 in the front surface of the video game device 12. The transmission adapter 44 is designed to be inserted into the handle 42b of the toy pistol 42.

When the game player aims the toy pistol 42 at the video game device 12 and pulls the trigger 42a, a control signal in the form of a radio wave is transmitted from the transmission adapter 44, as indicated by the arrow in FIG. 2. When the video game device 12 receives the control signal transmitted from the transmission adapter 44 at the reception adapter 40, it makes a determination that the enemy character in the display has been hit. With two hits, for example, the enemy character falls dead.

A description will now be given of the toy pistol 42.

Figure 3:
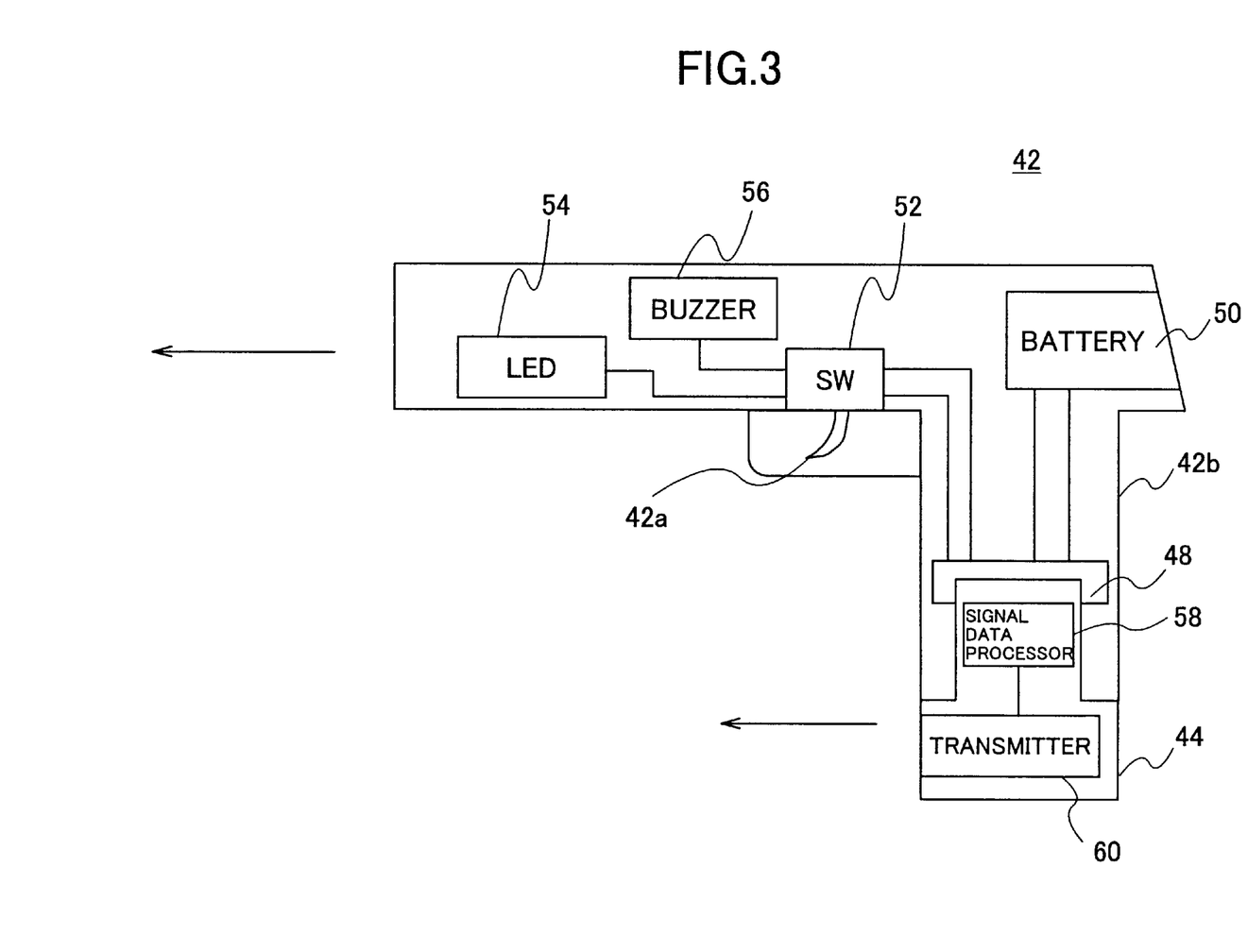
FIG. 3 is a block diagram of a state of attachment of the transmission adapter of the video game control adapter apparatus of the present invention to a toy pistol.

FIG. 3 is a block diagram showing the attachment of the transmission adapter of the present invention to the toy pistol.

As shown in FIG. 3, the toy pistol 42 comprises a connector 48 to which the transmission adapter 44 is connected, a battery 50, a switch 52 that turns ON and OFF with each revolution of the trigger 42a, a light emitting diode (LED) 54 that emits light in a direction toward which the toy pistol 42 is pointed when the switch 52 is turned ON, and a buzzer 56 that supplies an acoustic effect when the switch 52 is turned ON.

As noted previously, the transmission adapter 44 is formed into a substantially card-like shape, and comprises a signal data processor 58 for controlling the signals input and output via the connector 48, and a transmitter 60 that transmits control signal radio waves according to instructions from the signal data processor 58.

Accordingly, when the game player pulls the trigger 42a of the toy pistol 42, the transmission adapter 44 transmits a control signal and, at the same time, the LED 54 of the toy pistol 42 emits light and the buzzer 56 emits sound.

It should be noted that the toy pistol 42 is not something originally made specifically for use as a controller for this video game device 12 but is instead simply a commonly sold item. The only difference between the toy pistol 42 described here and an ordinary toy pistol is that the toy pistol 42 described here has a connector 48 to which the transmission adapter 44 can be adapted.

Accordingly, the game player does not need to purchase a special controller for the video game device 12. Instead, a previously purchased toy pistol, for example, can be used as the controller, that is, the toy described in the claims, of the video game device 12 simply by attaching the above-described transmission adapter 44, provided, of course, that the toy pistol has a switch, the connector 48 and a power supply.

Figure 4:
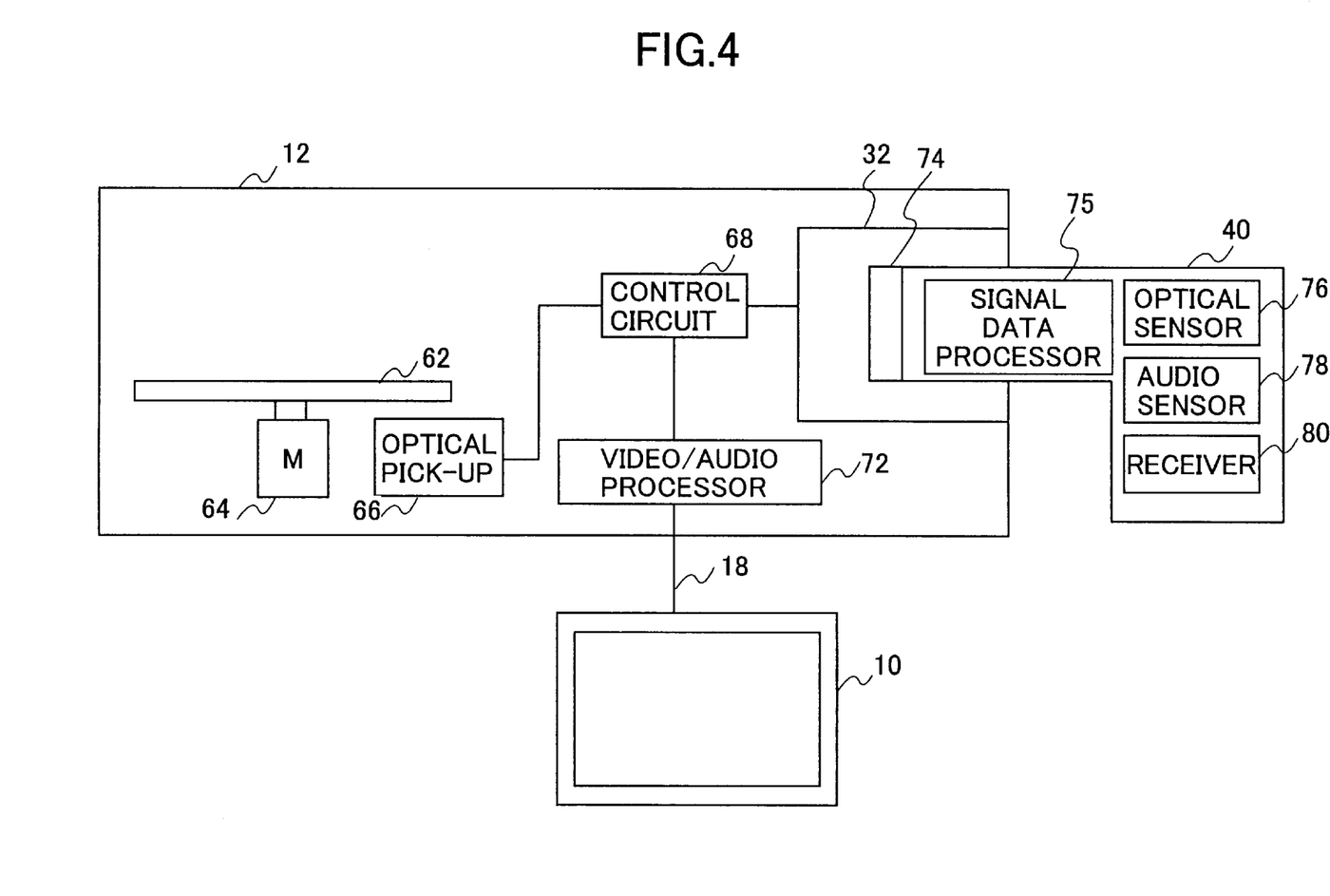
FIG. 4 is a block diagram of a state of attachment of the reception adapter of the video game control adapter apparatus of the present invention to a video game device.

FIG. 4 is a block diagram showing the attachment of the reception adapter of the present invention to a video game device.

As shown in FIG. 4, the video game device 12 comprises a motor 64 that rotatably drives a CD-ROM 62 contained in the disk holder portion 22, an optical pick-up 66 that reads the software data recorded on the CD-ROM 62, a control circuit 68 to which data signals output from the optical pick-up 66 are inputted, the connector 32 to which the reception adapter 40 is attached, a video/audio processor 72 that generates video and audio signals from the signals output from the control circuit 68 and outputs those signals to the television set 10. Additionally, the control circuit 68 arbitrarily selects data from among the data recorded on the CD-ROM 62 in response to the presence and absence of a control signal received at the reception adapter 40, and outputs the selected video and audio data to the video/audio processor 72.

Accordingly, when a signal transmitted from the toy pistol 42 is received at the reception adapter 40, the television set used as the video display 10 shows a bullet hitting the enemy character, and when such a signal transmitted from the toy pistol 42 is not received at the reception adapter 40, the bullet is shown missing the enemy character.

The reception adapter 40 comprises a connector 74 that is connected to the video game connector 32, a signal data processor 75 for controlling signals input and output via the connector 74, an optical sensor 76 that receives light as the control signal, an audio sensor 78, and a receiver 80 that receives control signals transmitted from the transmitter 60 of the transmission adapter 44.

Accordingly, the reception adapter 40 outputs a reception signal to the control circuit 68 via the signal data processor 75 and the connector 74 when either the receiver 80 of the reception adapter 40 receives a control signal transmitted from the toy pistol 42, or the optical sensor 76 of the reception adapter 40 receives light transmitted from the LED 54, or the audio sensor 78 of the reception adapter 40 receives the sound of a gunshot transmitted from the buzzer 56. As a result, the control circuit 68 determines that the bullet fired from the toy pistol 42 has scored a hit on the enemy character.

Figure 5:
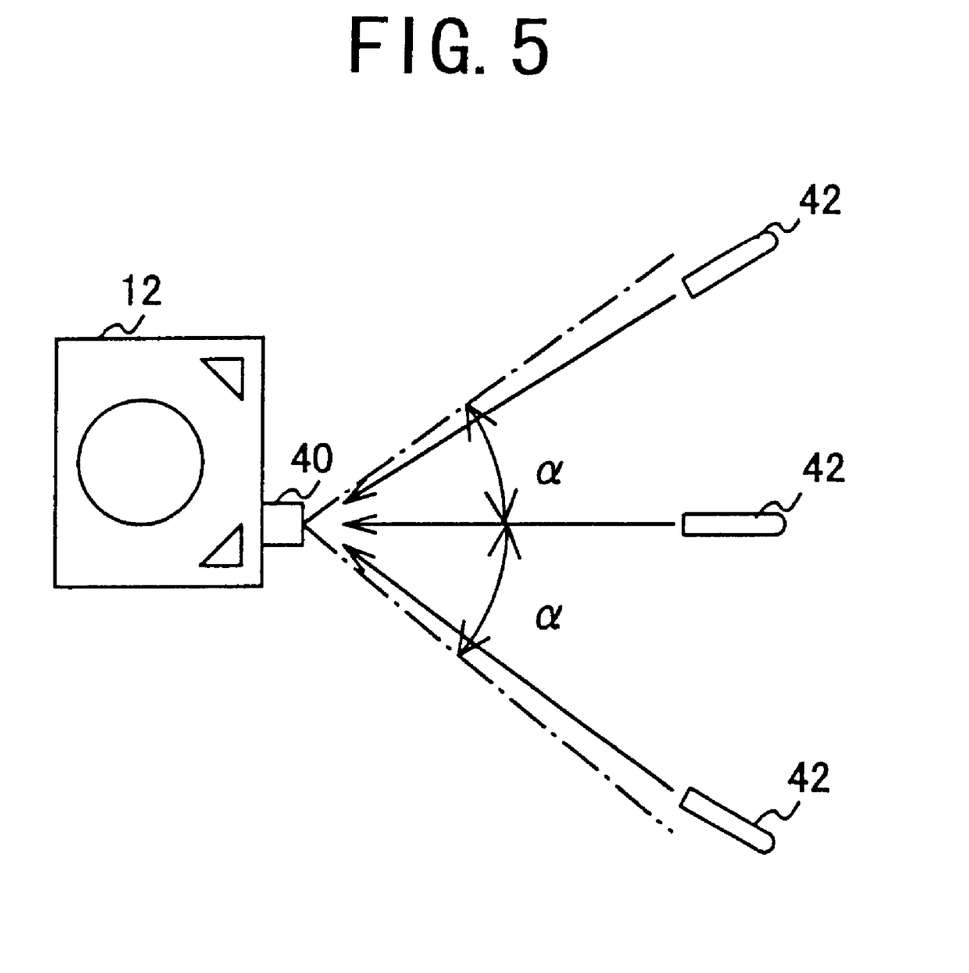
FIG. 5 is a plan view of a video game device fitted with the reception adapter of the video game control adapter apparatus of the present invention.

FIG. 5 is a plan view of a video game device fitted with the reception adapter of the present invention.

As shown in schematic form in FIG. 4, the receiver 80, optical sensor 76 and audio sensor 78 are provided on the front of the reception adapter 40 so as to face the game player and thus improve reception of the radio waves, light and/or sound emitted from the toy pistol 42. Additionally, the receiver 80, optical sensor 76 and audio sensor 78 are provided on the reception adapter 40. Additionally, the receiver 80, optical sensor 76 and audio sensor 78 provided on the reception adapter 40 each have a directivity varying laterally from a centerline by a predetermined angle θ such as, for example, 20–30 degrees. As a result, whenever the game player pulls the trigger 42a on the toy pistol 42 within the angle 2θ as shown in FIG. 5, the game player scores a hit on the enemy character because the transmitted signal is received at the reception adapter 40. However, if the game player pulls the trigger 42a on the toy pistol 42 when positioned outside the range 2θ as shown in FIG. 5, then the game player does not score a hit on the enemy character because the transmitted signal is not received at the reception adapter 40.

A description will now be given of a first variation of the present invention, and more specifically, of a variation of the control unit.

Figure 6:
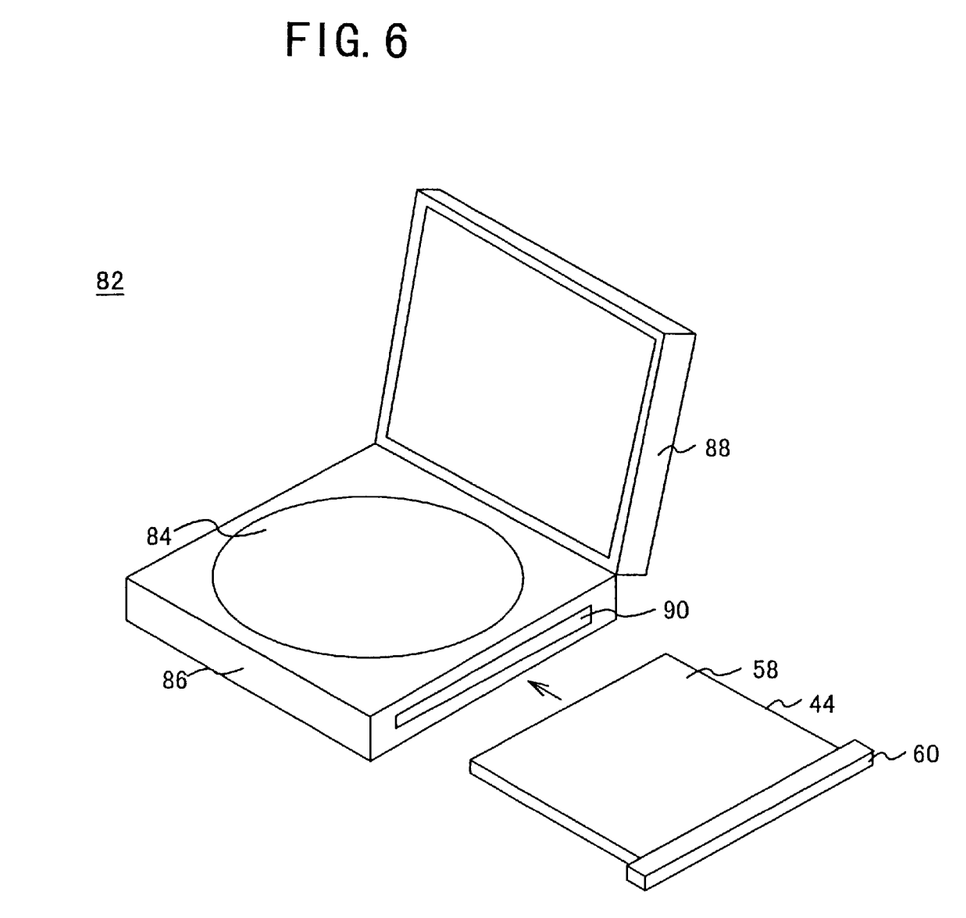
FIG. 6 is a perspective view of a first variation of the video game control adapter apparatus of the present invention.

FIG. 6 is a perspective view of a first variation of the present invention.

As shown in FIG. 6, a toy cosmetics compact is used as a control unit 82. The toy compact control unit 82 has a pad switch 84 that the game player touches provided on a top surface of a lower case half 86, and an upper case half or cover 88 hinged along one side of the lower case half 86. The toy compact control unit 82 functions as a controller used with game software targeting young female consumers, for example, so that, by touching the pad switch 84, the appearance of the character displayed on the video display 10 can be changed.

Additionally, a lower surface of the cover 88 is fitted with either a mirror or another control switch. A slot 90 for inserting the above-described transmission adapter 44 is provided along a lateral edge of the lower case half 86.

After inserting the transmission adapter 44 into the slot 90, the game player can then press the pad switch 84 to transmit a radio wave, light or sound control signal to the reception adapter 40 attached to the video game device 12. When such a signal is received at the reception adapter 40, the character displayed on the screen television set used as the video display 10 changes appearance or position.

As shown in FIG. 6, the transmission adapter 44 is shaped like a card. The advantage of the card-like shape is that it allows the transmission adapter to be used not only in the toy pistol 42 described above but also in a thin, flat control unit such as the toy compact control unit 82 described here.

A description will now be given of a second variation of the present invention, and more specifically, of a variation of the control unit.

Figure 7:
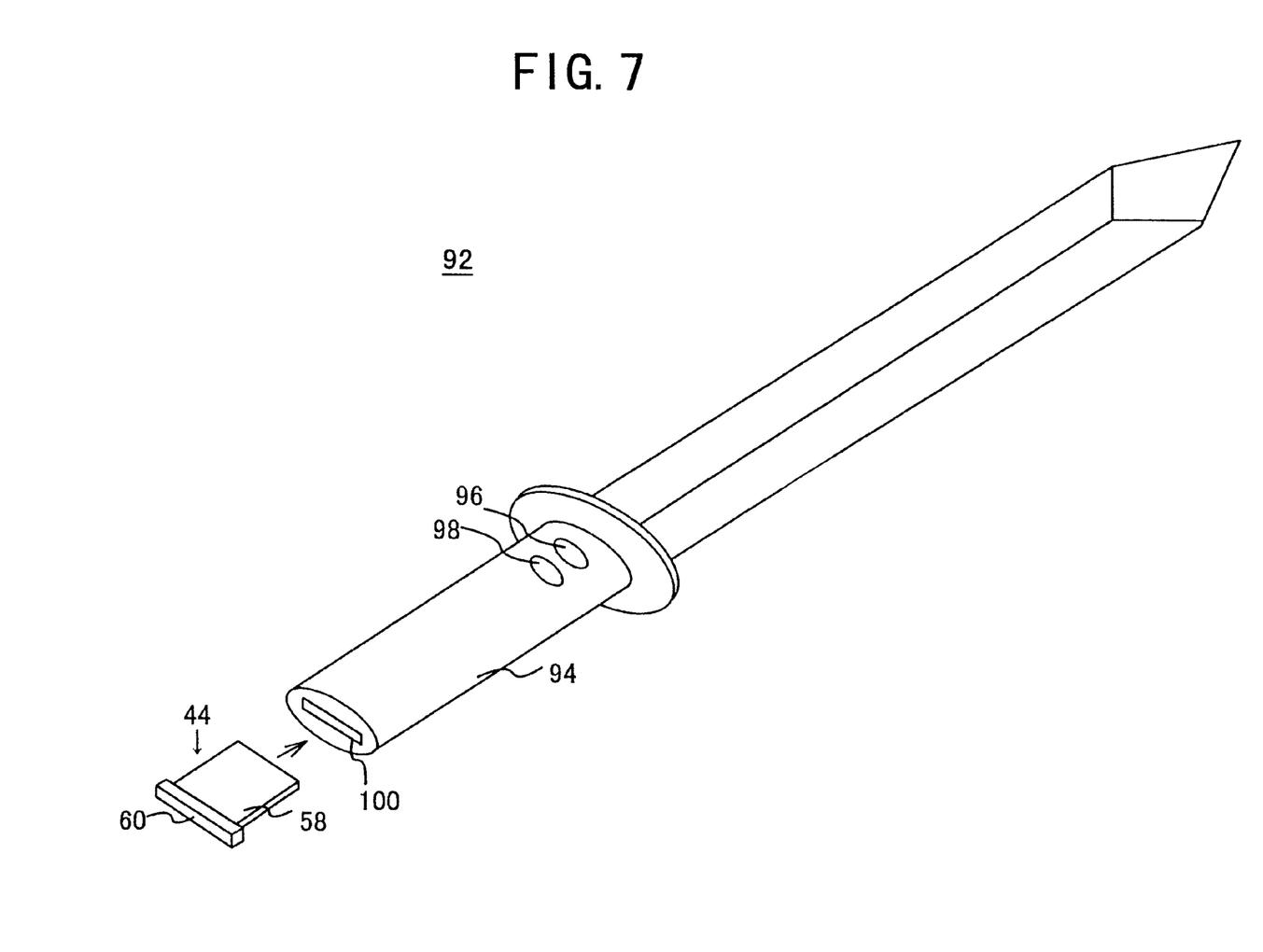
FIG. 7 is a perspective view of a second variation of the video game control adapter apparatus of the present invention.

FIG. 7 is a perspective view of a second variation of the present invention.

As shown in FIG. 7, a toy sword 92 is used as the control unit, with a grip portion 94 of the toy sword provided with switches 96, 98. By pressing the switches 96 or 98 and wielding the toy sword, the enemy character can be vanquished. Also, as shown in the diagram, a slot 100 for inserting the card-shaped transmission adapter 44 described above is provided at an end surface of the grip portion 94 of the toy sword 92.

After inserting the transmission adapter 44 into the slot 100, the game player can then press either of the two switches 96 and 98 to transmit a radio wave, light or sound control signal to the reception adapter 40 attached to the video game device 12. When such a signal is received at the reception adapter 40, the enemy character displayed on the screen television set used as the video display 10 is considered by the video game device 12 to have been cut down and is so displayed on the screen.

Thus, by attaching the transmission adapter 44 to in one case a toy pistol 42, in another case a toy compact 82, and in a third case a toy sword 92, items which are not originally designed as controllers for the video game device 12 can be made to act as such. The advantage is that it becomes possible to select a controller having a shape suited to the game software. Moreover, the reception adapter 40 and transmission adapter 44 can be used as a set, and as a set are less expensive than the special controllers sold separately.

It should be noted that although the embodiments described above make reference to control units in the form of toy pistols 42, toy compacts 82 and toy swords 92, the control unit is not limited to such forms but may consist of any toy to which the transmission adapter 44 can be successfully attached.

As can be appreciated by those of ordinary skill in the art, additional variations and embodiments of the invention are possible.

In one variation, the video game control adapter apparatus can be configured so that the adapters mounted on both the control unit (that is, the toy) and the video game device can both transmit and receive signals.

According to such a configuration, signals can be sent from the video game device to the toy gun of the present invention, thus triggering the LED of the gun and/or the buzzer and therefore providing a more realistic feel to the game.

In another variation, the adapter fitted to the control unit (that is, the toy) may further have a built-in LED and buzzer.

According to such a configuration, even toys which do not have an LED and buzzer, such as cosmetic compacts and swords, can be made to have the same effects as those described above with respect to the toy gun.

Additionally, by providing the toy with an adapter with transceiver capabilities, it becomes possible to play among a plurality of such toys without the need for the video game device.

The above description is provided in order to enable any person of ordinary skill in the art to make and use the invention and sets forth the best mode contemplated by the inventor of carrying out the invention.

The present invention is not limited to the specifically disclosed embodiments and variations, and modifications may be made without departing from the scope and spirit of the present invention.

The present application is based on Japanese Priority Application No. 2000-246493, filed on Aug. 15, 2000, the entire contents of which are hereby incorporated by reference.

What is claimed is:

1. A video game control adapter apparatus comprising:

a reception adapter that is attachable to a connector of a video game device that displays a game image on a video display; and a transmission adapter attachable to a toy having a switch, the transmission adapter capable of transmitting a control signal toward the reception adapter when the switch of the toy, to which the transmission adapter is attached, is switched ON, wherein the toy is capable of being played by itself and is also capable of sending the control signal through the transmission adapter attached thereto.

2. The video game control adapter apparatus as claimed in claim 1, wherein the reception adapter has directivity.

3. The video game control adapter apparatus as claimed in claim 1, wherein the transmission adapter is substantially card-shaped.

4. The video game control adapter apparatus as claimed in claim 1, wherein a transmitter of the transmission adapter that transmits the control signal is provided on a projecting portion that projects from the toy.

5. The video game control adapter apparatus as claimed in claim 4, wherein the control signal is a radio wave signal.

6. The video game control adapter apparatus as claimed in claim 4, wherein the control signal is an optical signal.

7. The video game control adapter apparatus as claimed in claim 4, wherein the control signal is an audio signal.

8. A video game system comprising:

a video game device;

a video display connected to the video game device by a cable; and a video game control adapter apparatus comprising:
a reception adapter that is attachable to a connector of the video game device that displays a game image on the video display; and
a transmission adapter attachable to a toy having a switch, the transmission adapter capable of transmitting a control signal toward the reception adapter when the switch of the toy, to which the transmission adapter is attached, is switched ON, wherein the toy is capable of being played by itself and is also capable of sending the control signal through the transmission adapter attached thereto.

* * * * *